(12) United States Patent
Kolb et al.

(10) Patent No.: US 8,227,552 B2
(45) Date of Patent: Jul. 24, 2012

(54) METHODS OF CONTROLLING POLYMER PROPERTIES

(75) Inventors: Rainer Kolb, Kingwood, TX (US); James M. Farley, League City, TX (US); John F. Szul, Hurricane, WV (US); Mark P. Ossowski, Bridgewater, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/276,693

(22) Filed: Oct. 19, 2011

(65) Prior Publication Data

US 2012/0041164 A1 Feb. 16, 2012

Related U.S. Application Data

(62) Division of application No. 12/523,400, filed as application No. PCT/US2008/000731 on Jan. 18, 2008.

(60) Provisional application No. 60/899,526, filed on Feb. 5, 2007.

(51) Int. Cl.
*C08L 23/08* (2006.01)
*C08F 4/6592* (2006.01)

(52) U.S. Cl. ........ 525/240; 525/191; 526/160; 526/165; 526/348; 526/943

(58) Field of Classification Search .................. 526/160, 526/165, 348, 352, 943; 525/240
See application file for complete search history.

(56) References Cited

U.S. PATENT DOCUMENTS

| | | |
|---|---|---|
| 3,819,592 A | 6/1974 | Visser |
| 5,382,630 A | 1/1995 | Stehling et al. |
| 6,072,007 A | 6/2000 | Abrigo et al. |
| 6,242,545 B1 | 6/2001 | Jejelowo et al. |
| 7,078,467 B1 | 7/2006 | Kolb et al. |
| 7,151,145 B1 | 12/2006 | Reinking |
| 2002/0143123 A1 | 10/2002 | Dekmezian |
| 2004/0121922 A1 | 6/2004 | Okada et al. |
| 2004/0122054 A1 | 6/2004 | Rosner |
| 2004/0225088 A1 | 11/2004 | Vaughan et al. |
| 2005/0148742 A1 | 7/2005 | Hagerty et al. |
| 2005/0282980 A1 | 12/2005 | Szul et al. |
| 2006/0281878 A1 | 12/2006 | Kolb et al. |
| 2010/0144989 A1 | 6/2010 | Kolb et al. |

FOREIGN PATENT DOCUMENTS

| | | |
|---|---|---|
| EP | 1209179 B1 | 11/2005 |
| EP | 1669373 A1 | 6/2006 |
| FR | 2269541 | 4/1975 |
| GB | 2051833 | 1/1981 |
| NL | 7505002 | 11/1975 |
| WO | 0149751 A1 | 7/2001 |
| WO | 0198409 A1 | 12/2001 |
| WO | 2004000919 A1 | 12/2003 |
| WO | 2005061225 A1 | 7/2005 |
| WO | 2005113610 A2 | 12/2005 |
| WO | 2006007046 A2 | 1/2006 |

*Primary Examiner* — Caixia Lu

(57) ABSTRACT

The invention generally provides for methods for controlling polymer properties. In particular, invention provides for methods for controlling the comonomer composition distribution of polyolefins such as ethylene alpha-olefin copolymers by altering at least one or more of the following parameters: the molar ratio of hydrogen to ethylene, the molar ratio of comonomer to ethylene, the partial pressure of ethylene, and the reactor temperature without substantially changing the density and/or the melt index of the copolymer.

26 Claims, 5 Drawing Sheets

METHODS OF CONTROLLING POLYMER PROPERTIES

CROSS REFERENCE TO RELATED APPLICATIONS

This application is a divisional application of Ser. No. 12/523,400, filed Feb. 18, 2010, which claims the benefit of Ser. No. 60/899,526, filed Feb. 5, 2007, the disclosures of which are incorporated by reference in their entireties.

FIELD OF THE INVENTION

The invention generally relates to methods for controlling polymer properties. In particular, the invention relates to methods for controlling the comonomer composition distribution of polyolefins such as ethylene alpha-olefin copolymers.

BACKGROUND

The composition distribution of a polyolefin such as an ethylene alpha-olefin copolymer refers to the distribution of comonomer (short chain branches) among the molecules that comprise the polyethylene polymer. When the amount of short chain branches varies among the polyethylene molecules, i.e., the amount of comonomer per 1000 carbons atoms varies with the length of the polyethylene molecules, the resin is said to have a "broad" composition distribution. When the amount of comonomer per 1000 carbons is similar among the polyethylene molecules of different chain lengths, the composition distribution is said to be "narrow."

The composition distribution is known to influence the properties of copolymers, for example, extractables content, environmental stress crack resistance, heat sealing, and tear strength. The composition distribution of a polyolefin may be readily measured by methods known in the art, for example, temperature raising elution fractionation (TREF) or crystallization analysis fractionation (CRYSTAF).

Polyolefins such as ethylene alpha-olefin copolymers are typically produced in a low pressure reactor, utilizing, for example, solution, slurry, or gas phase polymerization processes. Polymerization takes place in the presence of catalyst systems such as those employing, for example, a Ziegler-Natta catalyst, a chromium based catalyst, a metallocene catalyst, or combinations thereof.

It is generally known in the art that a polyolefin's composition distribution is largely dictated by the type of catalyst used and typically invariable for a given catalyst system. Ziegler-Natta catalysts and chromium based catalysts produce resins with broad composition distributions, whereas metallocene catalysts normally produce resins with narrow composition distributions. However, U.S. Pat. No. 6,242,545 and WO 2004/000919 disclose certain metallocenes, such as hafnocenes, that produce polyethylenes having a broad composition distribution.

Although the composition distribution is primarily dictated by the catalyst system used, attempts have been made to change the composition distribution of a polyolefin. For example, a desired composition distribution may be achieved with polymer blends. U.S. Pat. No. 5,382,630 discloses, inter alia, linear ethylene interpolymer blends made from components that can have the same molecular weight but different comonomer contents, or the same comonomer contents but different molecular weights, or comonomer contents that increase with molecular weight.

Another way to change the composition distribution utilizes multiple catalysts that respond differently to the comonomer concentration present in the reactor as is disclosed in, for example, U.S. Patent Application Publication Nos. 2004/0225088 and 2004/0122054.

And still other ways to produce a polyolefins having desired composition distributions is through the use of multiple reactors with one or more catalyst systems and/or with the use of a condensable agent in the reactor. For example, WO2006/007046 discloses, inter alia, a method of broadening the composition distribution breadth index (CDBI) of a single reactor/single catalyst system by increasing the amount of condensable agent in the reactor. However, sometimes there is no condensable agent present in the reactor or increasing the amount of condensable agent is not feasible because doing so would introduce particle stickiness and/or operability problems.

Other background references include WO 01/49751, WO 01/98409, EP 1 669 373 A, and U.S. Patent Application Publication Nos. 2004/121922 and 2005/148742.

Thus, methods to control the composition distribution of a polyolefin, such as an ethylene alpha-olefin copolymer, without having to use mixed catalysts, multiple reactors, condensable agents, and/or post reactor blending would be desirable and advantageous.

SUMMARY

The inventors have discovered such methods where the composition distribution of a polyolefin such as an ethylene alpha-olefin copolymer may be adjusted by altering at least one or more of the following: the molar ratio of hydrogen to ethylene, the molar ratio of comonomer to ethylene, the partial pressure of ethylene, and the reactor temperature.

The change or altering in composition distribution may be characterized by at least one or more of the following:
  a) the composition distribution changes such that the $T_{75}$-$T_{25}$ value changes by at least 5° C. or the $T_{90}$ value changes by at least 5° C. (as herein defined);
  b) the area under the high temperature peak in a TREF or CRYSTAF experiment (as herein defined) increases or decreases by at least 5%;
  c) the fraction of non-crystallizing polymer chains changes by at least 5%, wherein the fraction of non-crystallizing polymer chains is indicated by a stepwise increase in the trace below 30° C. in a CRYSTAF experiment (as herein defined);
  d) a decrease of one peak in a TREF or a CRYSTAF experiment (as herein defined) of a polyethylene having a bimodal composition distribution changes such that a unimodal composition distribution results; and
  e) the appearance of an additional peak in a TREF or a CRYSTAF experiment (as herein defined) of a polyethylene having a unimodal composition distribution changes such that a bimodal composition distribution results.

DETAILED DESCRIPTION

Figure 1:
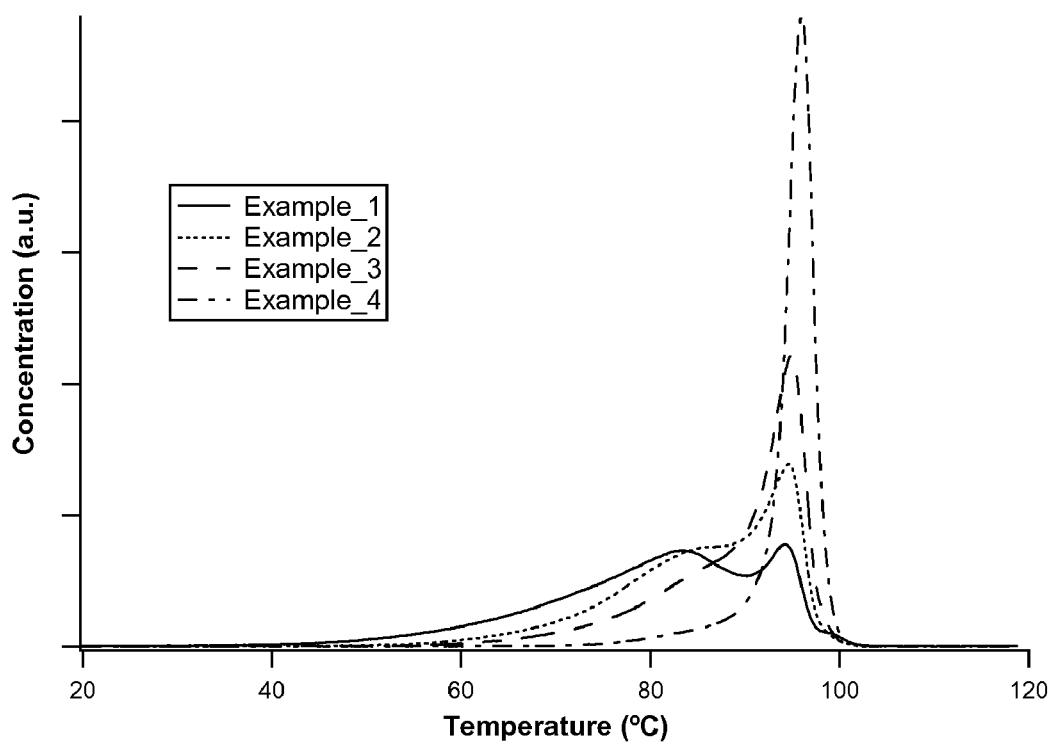
FIG. 1 is a representation of the TREF curves from examples 1-4 from Table 1, plotting normalized concentration as a function of elution temperature.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

Embodiments of the invention are directed to methods for controlling the composition distribution of polyolefins such as ethylene alpha-olefin copolymers by altering at least one or more of the following: the molar ratio of hydrogen to ethylene, the molar ratio of comonomer to ethylene, the reactor temperature, and the partial pressure of ethylene, in a reactor.

In another class of embodiments, the invention is directed to a method for changing the composition distribution of an ethylene alpha-olefin copolymer having of a bimodal composition distribution such that the ratio of the high temperature peak to low temperature peak in a CRYSTAF or a TREF experiment changes by at least 10%. Such results may be accomplished by altering at least one or more of the following: the molar ratio of hydrogen to ethylene, the molar ratio of comonomer to ethylene, the partial pressure of ethylene, and the reactor temperature, in a reactor, optionally, without substantially changing the copolymer's density.

In yet another class of embodiments, the invention is directed to a method for changing the composition distribution of an ethylene alpha-olefin copolymer having of a bimodal composition distribution such that the ratio of the high temperature peak to low temperature peak in a CRYSTAF or a TREF experiment changes by at least 10%. This may be accomplished by altering at least one or more of the following: the molar ratio of hydrogen to ethylene, the molar ratio of comonomer to ethylene, the partial pressure of ethylene, and the reactor temperature, optionally, without substantially changing the copolymer's density or melt index.

In a class of embodiments, the invention is directed to a method of changing the composition distribution of an ethylene alpha-olefin copolymer wherein the change in composition distribution is characterized by a change in the $T_{75}$-$T_{25}$ value by 5° C. or more. This may be accomplished by altering at least one or more of the following: the molar ratio of hydrogen to ethylene, the molar ratio of comonomer to ethylene, the partial pressure of ethylene, and the reactor temperature, optionally, without substantially changing the copolymer's density or melt index.

In another class of embodiments, the invention is directed to a method of changing the composition distribution of an ethylene alpha-olefin copolymer wherein the change in composition distribution is characterized by a change in the $T_{90}$ value by 5° C. or more. This may be accomplished by altering one or more of the following: the molar ratio of hydrogen to ethylene, the molar ratio of comonomer to ethylene, the partial pressure of ethylene, and the reactor temperature, optionally, without substantially changing the copolymer's density or melt index.

In another class of embodiments, the invention is directed to a method of forming a first and a second ethylene alpha-olefin copolymer, the method comprising contacting a single catalyst system, ethylene, at least one alpha-olefin other than ethylene, under polymerizable conditions in a single reactor;

wherein the first and a second ethylene alpha-olefin copolymer both have a density of 0.910 g/cc or greater, a melt index ratio from 15 to 50, and polymerized in a single reactor using single catalyst, and (a) wherein said first ethylene alpha-olefin copolymer is characterized by a monomodal composition distribution characterized as having a single peak in a TREF experiment, and wherein said second ethylene alpha-olefin copolymer has a multimodal composition distribution characterized as having at least two peaks in a TREF experiment; or, (b) wherein said first ethylene alpha-olefin copolymer has a multimodal composition distribution characterized by having at least two peaks in a TREF experiment, and said second ethylene alpha-olefin copolymer has a monomodal composition distribution characterized by having a single peak in a TREF experiment.

Also disclosed herein is a method of forming a first and a second ethylene alpha-olefin copolymer, the method comprising contacting a reaction mixture and a catalyst system comprising a hafnocene in a reactor, the reaction mixture comprising ethylene, hydrogen, and one or more alpha olefins, and altering at least one or more of the following: i) the molar ratio of hydrogen to ethylene, ii) the molar ratio of comonomer to ethylene, iii) the ethylene partial pressure and, and iv) the reactor temperature; so that the first ethylene alpha-olefin copolymer has a monomodal composition distribution characterized by having a single peak in a TREF experiment and the second ethylene alpha-olefin copolymer has a multimodal composition distribution characterized by having at least two peaks in a TREF experiment.

DEFINITIONS

As used herein, "polyethylene" refers to at least one ethylene alpha-olefin copolymer, the alpha-olefin being, for example, hexene and/or butene.

As used herein, "composition distribution" (sometimes referred to and used interchangeably as "comonomer composition distribution" or "short chain branch distribution") is the distribution of comonomer among the molecules that comprise the polyethylene resin. The composition distribution may be determined by a TREF or CRYSTAF experiment as described herein.

As used herein, a monomodal composition distribution may be identified by having only one distinct peak in a TREF or CRYSTAF experiment as described herein. A multimodal composition distribution, sometimes in some embodiments, a bimodal composition distribution, is identified by the appearance of at least two distinct peaks (e.g., two or more), a high temperature peak and a low temperature peak, in a TREF or a CRYSTAF experiment as described herein. A "peak" is present when the general slope of the graph changes from positive to negative with increasing temperature. Two "peaks" are present when there is a local minimum present between the peaks in which the general slope of the graph changes from negative to positive with increasing temperature. The relative ratio of the two peaks may be determined from a TREF or CRYSTAF curve using a Gaussian fit to each of the peaks in the TREF or CRYSTAF curve and integrating the area under each peak wherein the integral under the entire curve is normalized to 100%.

As used herein, the $T_{90}$, $T_{75}$, $T_{25}$, values represent the temperatures at which 90%, 75% and 25%, respectively, of the polymer elutes in a TREF experiment as described herein.

As used herein, the high density fraction (% high density) is calculated from the integral under the peak that elutes at the higher temperature in the TREF or CRYSTAF wherein the integral under the entire curve is normalized to 100%.

As used herein, the non-crystallizing (% non-crystallizing) fraction is indicated by a stepwise increase in the trace below 30° C. in a CRYSTAF experiment. The non-crystallizing fraction is calculated by integrating the area of the low temperature side under the CRYSTAF curve wherein the integral under the entire curve is normalized to 100%.

As used herein, density is measured by the gradient technique according to ASTM D 1505.

As used herein, melt index is measured according to ASTM-D-1238-E (190° C., 2.16 kg weight).

As used herein, "substantially" in the phrase "without substantially changing the copolymer's density" means that the density change (+/−) is less than 0.015 g/cm$^3$ in some embodiments, less than 0.008 g/cm$^3$ in other embodiments and less than 0.004 g/cm$^3$ in yet other embodiments.

As used herein, "substantially" in the phrase "without substantially changing the copolymer's density or melt index" means that the density change (+/−) is less than 0.015 g/cm$^3$ in some embodiments, less than 0.008 g/cm$^3$ in other embodiments and less than 0.004 g/cm$^3$ in yet other embodiments, and that the melt index change (+/−) is less than 2 g/10 min in some embodiments, less than 1 g/10 min in other embodiments and less than 0.5 g/10 min in yet other embodiments.

As used herein, TREF is measured using an analytical size TREF instrument (available from Polymerchar, Spain), with a column of the following dimensions: inner diameter (ID) 7.8 mm, outer diameter (OD) 9.52 mm, and a column length of 15 cm. The column is filled with steel beads. 0.5 mL of a 6.4% (w/v) polymer solution in orthodichlorobenzene (ODCB) (ODCB, Aldrich 99+% stabilized with 0.5 g BHT/4 L) containing 6 g BHT/4 L (2,6-Di-tert-butyl-4-methylphenol) is charged onto the column and cooled from 140° C. to 25° C. at a constant cooling rate of 1.0° C./min. Subsequently, the ODCB is pumped through the column at a flow rate of 1.0 ml/min, and the column temperature is increased at a constant heating rate of 2° C./min to elute the polymer. The polymer concentration in the eluted liquid is detected by means of measuring the absorption at a wave number of 2857 cm$^{-1}$ using an infrared detector. The concentration of the polymer in the solution is then calculated from the absorption and plotted as a function of temperature.

As used herein, CRYSTAF is measured using a commercial instrument by PolymerChar S.A., Model No. 200. Approximately 20-30 mg of polymer are placed in a reactor and dissolved in 30 mL 1,2 dichlorobenzene (ODCB, Aldrich 99+% stabilized with 0.5 g BHT/4 L) at 160° C. for 60 minutes followed by 45 minutes equilibration time at 100° C. The polymer solutions are cooled to 0° C. using a crystallization rate of 0.2° C./min. A two wavelength infrared detector is used to measure the polymer concentration during crystallization (3.5 μm, 2853 cm$^{-1}$ sym. stretch) and to compensate for base line drifts (3.6 μm) during the analysis time. The solution concentration is monitored at certain temperature intervals, yielding a cumulative concentration curve. The derivative of this curve with respect to temperature (dw/dT) represents the weight fraction of crystallized polymer at each temperature. This derivative of the cumulative concentration curve then plotted as a function of the crystallization temperature.

Catalyst Components

The catalyst system comprises any desirable catalyst composition known in the art useful in polymerizing olefins such as, but not limited to, vanadium based catalysts, titanium based Ziegler-Natta catalysts (which may include a magnesium component), metallocenes, such as Group 4 metallocenes (preferably, hafnocenes and zirconocenes), chromium and chromium oxide based catalyst compositions, and Group 3-10 coordination-type catalysts systems (e.g., bidentate or tridentate amine/imine coordination complexes with iron, palladium, nickel or zirconium). As used herein, the International Union of Pure and Applied Chemistry (IUPAC) notation (3 Oct. 2005) (www.iupac.org/reports/periodictable/) of the periodic table will be referenced unless otherwise specified.

In a class of embodiments, the polymerization catalyst comprises a metallocene; in a preferred embodiment, the catalyst composition comprises a hafnocene; in a most preferred embodiment, the metallocene of the catalyst composition consists essentially of a hafnocene, i.e., one metal complex of hafnium and at least one ligand.

The "hafnocene" may be a catalyst component comprising mono-, bis- or tris-cyclopentadienyl-type complexes of hafnium. In an embodiment, the cyclopentadienyl-type ligand comprises cyclopentadienyl or ligands isolobal to cyclopentadienyl and substituted versions thereof. Representative examples, but not exclusive, of ligands isolobal to cyclopentadienyl include cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind") and substituted versions thereof. In one embodiment, the hafnocene is an unbridged bis-cyclopentadienyl hafnocene and substituted versions thereof. In another embodiment, the hafnocene excludes unsubstituted bridged and unbridged bis-cyclopentadienyl hafnocenes, and unsubstituted bridged and unbridged bis-indenyl hafnocenes, "unsubstituted" meaning that there are only hydride groups bound to the rings and no other group.

Preferably, the hafnocene useful in the present invention can be represented by the formula (where "Hf" is hafnium):

$$Cp_n HfX_q \qquad (1)$$

wherein n is 1 or 2, q is 1, 2 or 3, each Cp is independently a cyclopentadienyl ligand or a ligand isolobal to cyclopentadienyl or a substituted version thereof bound to the hafnium; and X is selected from the group consisting of hydride, halides, $C_1$ to $C_{10}$ alkyls and $C_2$ to $C_{12}$ alkenyls; and wherein when n is 2, each Cp may be bound to one another through a bridging group A selected from the group consisting of $C_1$ to $C_5$ alkylenes, oxygen, alkylamine, silyl-hydrocarbons, and siloxyl-hydrocarbons. An example of $C_1$ to $C_5$ alkylenes include ethylene (—$CH_2CH_2$—) bridge groups; an example of an alkylamine bridging group includes methylamide (—($CH_3$)N—); an example of a silyl-hydrocarbon bridging group includes dimethylsilyl (—($CH_3$)$_2$Si—); and an example of a siloxyl-hydrocarbon bridging group includes (—O—($CH_3$)$_2$Si—O—).

In an embodiment of the hafnocene represented in formula (1), n is 2 and q is 1 or 2.

As used herein, the term "substituted" means that the referenced group possesses at least one moiety in place of one or more hydrogens in any position, the moieties selected from such groups as halogen radicals (esp., F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof.

In another class of embodiments, the hafnocene useful in the present invention can be represented by the formula:

(CpR$_5$)$_2$HfX$_2$     (2)

wherein each Cp is a cyclopentadienyl ligand and each is bound to the hafnium; each R is independently selected from hydrides and $C_1$ to $C_{10}$ alkyls, most preferably hydrides and $C_1$ to $C_5$ alkyls; and X is selected from the group consisting of hydride, halide, $C_1$ to $C_{10}$ alkyls and $C_2$ to $C_{12}$ alkenyls, and more preferably X is selected from the group consisting of halides, $C_2$ to $C_6$ alkylenes and $C_1$ to $C_6$ alkyls, and most preferably X is selected from the group consisting of chloride, fluoride, $C_1$ to $C_5$ alkyls and $C_2$ to $C_6$ alkylenes. In an embodiment, the hafnocene is represented by formula (2) above, wherein at least one R group is an alkyl as defined above, preferably a $C_1$ to $C_5$ alkyl, and the others are hydrides. In another embodiment, each Cp is independently substituted with from one two three groups selected from the group consisting of methyl, ethyl, propyl, butyl, and isomers thereof.

The hafnocene may be selected from the group consisting of bis(n-propylcyclopentadienyl)hafnium X$_2$, bis(n-butylcyclopentadienyl)hafnium X$_2$, bis(n-pentylcyclopentadienyl)hafnium X$_2$, (n-propyl cyclopentadienyl)(n-butylcyclopentadienyl)hafnium X$_2$, bis[(2-trimethylsilylethyl)cyclopentadienyl]hafnium X$_2$, bis(trimethylsilyl cyclopentadienyl)hafnium X$_2$, dimethylsilylbis(n-propylcyclopentadienyl)hafnium X$_2$, dimethylsilylbis(n-butylcyclopentadienyl)hafnium X$_2$, bis(1-n-propyl-2-methylcyclopentadienyl)hafnium X$_2$, and (n-propylcyclopentadienyl)(1-n-propyl-3-n-butylcyclopentadienyl)hafnium X$_2$, wherein X is selected from the group consisting of halogen ions, hydrides, C1-12 alkyls, C2-12 alkenyls, C6-12 aryls, C7-20 alkylaryls, C1-12 alkoxys, C6-16 aryloxys, C7-18 alkylaryloxys, C1-12 fluoroalkyls, C6-12 fluoroaryls, and C1-12 heteroatom-containing hydrocarbons and substituted derivatives thereof.

In certain embodiments, the polymerization process may be carried out such that the catalyst composition is heterogeneous and the catalyst composition comprises at least one support material. The support material may be any material known in the art for supporting catalyst compositions, such as an inorganic oxide, preferably silica, alumina, silica-alumina, magnesium chloride, graphite, magnesite, titania, zirconia, and montmorillonite, any of which can be chemically/physically modified such as by fluoriding processes, calcining, or other processes known in the art.

In an embodiment, the support material may be a silica material having an average particle size as determined by Malvern analysis of from 0.1 to 100 μm, most preferably 10 to 50 μm.

In a class of embodiments, the catalyst composition may comprises at least one activator. Such activators are well known in the art and include but are not limited to Lewis acids such as cyclic or oligomeric poly(hydrocarbylaluminum oxides and so called non-coordinating activators ("NCA").

The at least one activator may also comprise an alumoxane (e.g., methylalumoxane "MAO") and modified alumoxane (e.g., "MMAO" or "TIBAO"). The activators are widely used and known in the art and may be suitable to activate catalyst for olefin polymerization.

In a preferred embodiment, the activator is an alumoxane, and most preferably methalumoxane such as described by J. B. P. Soares and A. E. Hamielec in 3(2) POLYMER REACTION ENGINEERING 131-200 (1995). The alumoxane may be co-supported on the support material, optionally, in a molar ratio of aluminum to hafnium (Al:Hf) ranging from 50:1 to 200:1, or 80:1 to 120:1.

Polymerization Process

The "polymerization reactor" may be any type of reactor known in the art that is useful in producing polyolefins. An example of such reactor is a continuous gas phase reactor, more particularly, a continuous fluidized bed gas phase reactor.

Such reactors, for example, are generally capable of being operated at an overall pressure of less than 10,000 kPa, preferably less than 8,000 kPa, and even more preferably less than 6,000 kPa, and even more preferably less than 4,000 kPa, and most preferably less than 3,000 kPa.

In a class of embodiments, the reactor is a "continuous" reactor, meaning that monomers and catalyst composition are continually or regularly fed to the reactor while the polymer product, for example, polyethylene is continually or regularly extracted from the reactor. Such polymerization reactors include so called "slurry" reactors, "solution" reactors, and "fluidized bed gas phase" reactors. Such reactors are outlined by A. E. Hamielec and J. B. P. Soares in Polymerization Reaction Engineering—Metallocene Catalysts, 21 PROG. POLYM. SCI. 651-706 (1996).

In a special class of embodiments, the polymerization reactor useful in the invention is a continuous fluidized bed gas phase reactor comprising a feed stream or "cycle gas" comprising the ethylene and a comonomer, for example, hexene, butene, octene, and/or mixtures thereof, both of which are flowed continuously through the polymerization reactor by any suitable means. Such reactors are well known in the art and described in more detail in U.S. Pat. Nos. 5,352,749, 5,462,999, and WO 03/044061. The amount of comonomer can be expressed as a molar ratio relative to the amount of ethylene in the reactor. Preferably, the feed stream or "cycle gas" is provided to assist the reactor in maintaining a continuous flow of ethylene and comonomer.

In embodiments utilizing the fluidized bed gas phase reactor, a monomer stream is passed to a polymerization section. As an illustration of the polymerization section, there can be included a reactor in fluid communication with one or more discharge tanks, surge tanks, purge tanks, and recycle compressors. In one or more embodiments, the reactor includes a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and at least one other α-olefin, and may also include "condensing agents" as is known in the art and disclosed in, for example, U.S. Pat. Nos. 4,543,399, 5,405,922, and 5,462,999.

The fluidized bed has the general appearance of a dense mass of individually moving particles, preferably polyethylene particles, as created by the percolation of gas through the bed. The pressure drop through the bed may be equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity may be at least two times the minimum flow velocity.

In general, the height to diameter ratio of the reaction zone may vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. That gas exiting the overhead of the reactor is the recycle gas stream.

The recycle stream is compressed in a compressor and then passed through a heat exchange zone where heat is removed before it is returned to the bed. The heat exchange zone is typically a heat exchanger which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Typically, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in, for example, U.S. Pat. Nos. 4,933,149 and 6,627,713.

The catalyst composition or system used in the fluidized bed is preferably stored for service in a reservoir under a blanket of a gas which is inert (or does not react during the polymerization process) to the stored material, such as nitrogen or argon. The catalyst composition may be added to the reaction system, or reactor, at any point and by any suitable means, and is preferably added to the reaction system either directly into the fluidized bed or downstream of the last heat exchanger (the exchanger farthest downstream relative to the flow) in the recycle line, in which case the activator is fed into the bed or recycle line from a dispenser. The catalyst composition is injected into the bed at a point above distributor plate. Preferably, the catalyst composition is injected at a point in the bed where good mixing with polymer particles occurs. Injecting the catalyst composition at a point above the distribution plate provides satisfactory operation of a fluidized bed polymerization reactor.

The monomers can be introduced into the polymerization zone in various ways including direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of polyolefin may be conveniently controlled by adjusting the rate of catalyst composition injection, activator injection, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particular polymer formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In order to maintain an adequate reactor operability and catalyst productivity, it is preferable that the reactor temperature of the fluidized bed in the fluidized bed gas-phase reactor embodiment herein ranges from 70° C. or 75° C. or 80° C. to 90° C. or 95° C. or 100° C. or 110° C., wherein a desirable temperature range comprises any upper temperature limit combined with any lower temperature limit described herein. In addition to using the reactor temperature as a means to maintain reactor operability and catalyst productivity, the present invention provides for a method to use the reactor temperature, among other variables, to alter the composition distribution of the polyolefin.

In a class of embodiment, in order to maintain an adequate catalyst productivity in the present invention, it is preferable that the ethylene is present in the reactor at a partial pressure at or greater than 100 psia (690 kPa), or 120 psia (830 kPa), or 190 psia (1300 kPa), or 200 psia (1380 kPa), or 210 psia (1450 kPa), or 220 psia (1515 kPa); and less than 10,000 kPa in a preferred embodiment. In addition to using the partial pressure of ethylene as a means to maintain catalyst productivity, the present invention provides for a method to use the partial pressure of ethylene, among other variables, to alter the composition distribution of the polyolefin.

In certain embodiments, the process of the invention is characterized in that when the ethylene partial pressure is changed by at least 50 kPa or the reactor temperature is changed by at least 1° C. or both, the composition distribution of the produced polyethylene changes. This change in composition distribution may be characterized by one or more of the following:

a) the composition distribution changes such that the $T_{75}$-$T_{25}$ value changes by at least 5° C. or the $T_{90}$ value changes by at least 5° C.;
b) the area under the high temperature peak in a TREF or CRYSTAF experiment increases or decreases by at least 5%;
c) the fraction of non-crystallizing polymer chains changes by at least 5%, wherein the fraction of non-crystallizing polymer chains is indicated by a stepwise increase in the trace below 30° C. in a CRYSTAF experiment;
d) a decrease of one peak in a TREF or a CRYSTAF experiment of a polyethylene having a bimodal composition distribution such that a unimodal composition distribution results; and
e) the appearance of an additional peak in a TREF or a CRYSTAF experiment of a polyethylene having a unimodal composition distribution such that a bimodal composition distribution results.

The molar ratio of copolymer to ethylene may be used to control the density of the resultant ethylene alpha-olefin copolymer, where higher molar ratios of copolymer to ethylene produce lower density polyethylenes. The final polyethylene product may comprise from 0 to 15 or 20 wt % comonomer derived units. Preferably, ethylene is copolymerized with α-olefins containing from 3 to 12 carbon atoms in one embodiment, and from 4 to 10 carbon atoms in yet another embodiment, and from 4 to 8 carbon atoms in a preferable embodiment. In several embodiments, ethylene is copolymerized with 1-butene or 1-hexene.

The comonomer is present at any level that will achieve the desired weight percent incorporation of the comonomer into the finished polyethylene, and thus a desired density. The molar ratio of comonomer to ethylene as described herein, is the ratio of the gas concentration of comonomer moles in the cycle gas to the gas concentration of ethylene moles in the cycle gas. In one embodiment, the comonomer is present with ethylene in the cycle gas in a mole ratio range of from 0.0001 (comonomer:ethylene) to 0.20 or 0.10, and from 0.001 to 0.1 in another embodiment, and from 0.001 to 0.050 in yet another embodiment, and from 0.002 to 0.030 in yet another embodiment, wherein a desirable range may comprise any combination of any upper limit with any lower limit as described herein. In addition to providing a means for controlling basic properties of the produced polyolefin such as $I_{21}$ and/or $I_2$ and bulk density, the present invention provides for a method to use the comonomer to ethylene ratio, among other variables, to alter the composition distribution of the polyolefin.

Hydrogen gas may also be added to the polymerization reactor to achieve a desired melt index, such as $I_2$ or $I_{21}$. In one embodiment, the ratio of hydrogen to total ethylene monomer (ppm $H_2$: mol % $C_2$) in the circulating gas stream is in a range of from 0 to 60:1 in one embodiment, and from 0.10:1 (0.10) to 50:1 (50) in another embodiment, and from 0.12 to 40 in yet another embodiment, and from 0.15 to 35 in yet another embodiment, wherein a desirable range may comprise any combination of any upper mole ratio limit with any lower mole ratio limit described herein. In addition to providing a means for controlling basic properties of the produced polyolefin such as $I_{21}$ and/or $I_2$ and bulk density, the present invention provides for a method to use the hydrogen to ethylene ratio, among other variables, to alter the composition distribution of the polyolefin.

In certain embodiments, the process of the invention is characterized in that when the hydrogen to ethylene ratio in the reactor or the comonomer to ethylene ratio in the reactor or both is changed by at least 5%, the composition distribution of the produced polyethylene changes. This change in composition distribution may be characterized by one or more of the following:

a) the composition distribution changes such that the $T_{75}$-$T_{25}$ value changes by at least 5° C. or the $T_{90}$ value changes by at least 5° C.;
b) the area under the high temperature peak in a TREF or CRYSTAF experiment increases or decreases by at least 5%;
c) the fraction of non-crystallizing polymer chains changes by at least 5%, wherein the fraction of non-crystallizing polymer chains is indicated by a stepwise increase in the trace below 30° C. in a CRYSTAF experiment;
d) a decrease of one peak in a TREF or a CRYSTAF experiment of a polyethylene having a bimodal composition distribution such that a unimodal composition distribution results; and
e) the appearance of an additional peak in a TREF or a CRYSTAF experiment of a polyethylene having a unimodal composition distribution such that a bimodal composition distribution results;

Polymer

The present invention is suitable for forming a broad range of polyethylene copolymers. In one embodiment, the polyethylene produced from the process of the invention has a melt index ($I_2$ as measured according to ASTM-D-1238-E 190° C./2.16 kg) of from 0.01 to 200 dg/min. Further, the polyethylene may have an $I_{21}/I_2$ ($I_{21}$ as measured by ASTM-D-1238-F, 190° C./21.6 kg) value of from 10 to 100 in one embodiment, and from 10 to 50 in yet another embodiment, and from 12 to 40 in yet another embodiment, and from 15 to 35 in yet another embodiment.

The density of the polyethylenes described herein may range from 0.910 to 0.975 g/cm$^3$ preferably form 0.910 to 0.965 g/cm$^3$ more preferably form 0.910 to 0.960 g/cm$^3$ as measured by ASTM D 792.

The polyethylene preferably may have a molecular weight distribution of from 2 to 15 in one embodiment, and from 2 to 10 in another embodiment, and from 2.5 to 8 in yet another embodiment, and from 2.5 to 5 in yet another embodiment, wherein a desirable range may comprise any combination of any upper limit with any lower limit described herein.

The polyethylene may have a hexane extractables value (as measured by 21 CFR 177.1520(d)(3)(i)) of less than 2% in one embodiment, and less than 1% in another embodiments.

In certain embodiments, the polyethylene has substantially no chromium, zirconium, vanadium or titanium content, that is only amounts that would be considered by those skilled in the art trace amounts of these metals, such as, for example, less than 0.01 ppm. In other embodiments, the polyethylene comprises from 0.001 to 4 ppm of hafnium, and more preferably between 0.001 and 3 ppm of hafnium. The metals content may be determined by X-ray fluorescence analysis (XRF) or Inductively Coupled Plasma-Atomic Emission Spectrometry (ICP-AES), as is known in the art.

The polyethylene can be formed into any useful article of manufacture by any suitable means. The polyethylenes of the invention are well suited for films made by the cast or blown film extrusion processes. The polyethylenes of the invention are particularly well suited for being formed into an article by a rotational molding or injection molding process. Such processes are well known in the art. Typical rotational molded articles include large containers for conveying liquids, drums, agricultural tanks, and large parts such as canoes or large playground toys. Typical injection molded articles include, housewares, thin wall containers, and lids for containers.

It is contemplated by the inventors that the polyethylene of the present invention may be blended with other polymers and/or additives to form compositions that can be used in articles of manufacture. The blends may be formed into such articles of manufacture by cast film extrusion, blown film extrusion, rotational molding or injection molding processes.

In a class of embodiments and in one aspect of the invention, to polymerize ethylene and one or more alpha-olefins with a catalyst system in a polymerization reactor, wherein the composition distribution may be altered by changing one or more of the following: the molar ratio of comonomer to ethylene, the molar ratio of hydrogen to ethylene or the partial pressure of ethylene and the reactor temperature. Preferably, the polymerization reactor is a single continuous gas phase reactor operating at less than 10,000 kPa pressure and the catalyst system comprises a single metallocene catalyst such as described herein. Preferably, the single metallocene system a hafnocene.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

Examples 1-8

Ethylene/1-hexene copolymers were produced according to the following procedure. The catalyst composition comprised a silica supported bis(n-propylcyclopentadienyl) hafnium dichloride with methalumoxane, the Al:Hf ratio being from about 80:1 to 130:1. Methods of preparing the catalyst composition are disclosed in, for example U.S. Pat. No. 6,242,545. The catalyst composition was injected dry into a fluidized bed gas phase polymerization reactor. More particularly, polymerization was conducted in a 152.4 mm diameter gas-phase fluidized bed reactor operating at approximately 2068 kPa total pressure. The reactor bed weight was approximately 2 kg. Fluidizing gas was passed through the bed at a velocity of approximately 0.6 m per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reactor temperature as specified in Tables 1 and 2. Ethylene, hydrogen, 1-hexene and nitrogen were fed to the cycle gas loop just upstream of the compressor at quantities sufficient to maintain the desired gas concentrations as specified in Tables 1 and 2. Gas concentrations were measured by an on-line vapor fraction analyzer. Product (polyethylene particles) was withdrawn from the reactor in batch mode into a purging vessel before it was transferred into a product bin. Residual catalyst and activator in the resin was deactivated in the product drum with a wet nitrogen purge. The catalyst was fed to the reactor bed through a stainless steel injection tube at a rate sufficient to maintain the desired polymer production rate. "$C_6/C_2$ flow ratio ("FR")" is the ratio of the lbs of 1-hexene comonomer feed to the pounds of ethylene feed to the reactor, whereas the $C_6/C_2$ ratio is the ratio of the gas concentration of 1-hexene moles in the cycle gas to the gas concentration of ethylene moles in the cycle gas. The $C_6/C_2$ ratio is obtained from a cycle gas vapor fraction analyzer, whereas the $C_6/C_2$ Flow Ratio comes from some measure of the mass flow. The cycle gas is the gas in the reactor, and is measured from a tap off the recirculating loop around the reactor. The ratios reported in the following tables (Tables 1-4) are from the gas concentrations in the reactor. Samples are taken every 9 min, and thus reported $C_6/C_2$ ratios are running averages. Tables 1 and 2 summarize the respective gas concentrations and reactor variables as well as densities and melt indices of the produced polymers.

Examples 9-13

The ethylene/1-hexene copolymers were produced in a continuous gas phase fluidized bed reactor similar to the one used in Examples 1-8, except the diameter is 14 inches (355.6 mm), with varying reactor temperature and partial pressure of ethylene. The catalyst composition comprised silica supported bis(n-propylcyclopentadienyl)hafnium dichloride with methalumoxane, the Al:Hf ratio being from about 80:1 to 130:1. Table 3 summarizes the respective gas concentrations and reactor variables as well as density and melt index of the produced polymers.

Table 1 is directed to gas phase polymerizations of ethylene and 1-hexene with the bis-(n-propylcyclopentadienyl) hafnium dichloride catalyst where the amounts of comonomer and hydrogen are varied in the reactor while maintaining a density range from about 0.922 g/cm³ to about 0.926 g/cm³. The melt index was measured according to ASTM-D-1238-E (190° C., 2.16 kg weight). The density was measured according to ASTM D 792. $T_{90}$, $T_{75}$ and $T_{25}$ were measure as described herein.

TABLE 1

| Example | -001 | -002 | -003 | -004 |
|---|---|---|---|---|
| Process data | | | | |
| Molar H2/C2 ratio | 8.7E-4 | 4.6E-4 | 4.6E-4 | 0.14E-4 |
| Molar C6/C2 ratio | 0.013 | 0.011 | 0.009 | 0.005 |
| C2 partial pressure (psi) | 130 | 130 | 130 | 130 |
| RX pressure (psig) | 300 | 300 | 300 | 300 |
| H2 conc. mol ppm | 296 | 162 | 162 | 49 |
| H2 flow/sccm | 8.3 | 4.66 | 5.8 | 0 |
| C6 conc. (mol %) | 0.44 | 0.37 | 0.31 | 0.17 |
| C2 conc. (mol %) | 33.9 | 34.9 | 35 | 35.1 |
| C6/C2 flow ratio | 0.071 | 0.059 | 0.047 | 0.022 |
| C2 flow (g/hr) | 390 | 478 | 551 | 551 |
| Reactor Temp (° C.) | 79.5 | 79.5 | 79.5 | 79.5 |
| Production g (polymer)/hr | 337 | 404 | 469 | 431 |
| Residence time (hr) | 5.6 | 4.7 | 4.1 | 4.4 |
| Avg velocity (ft/s) | 1.55 | 1.58 | 1.57 | 1.58 |
| Resin Properties | | | | |
| $T_{90}$ | 94.2 | 95.2 | 96 | 97.5 |
| $T_{75}$-$T_{25}$ | 15.1 | 11.8 | 9.1 | 2.2 |
| Melt Index (dg/min) | 10.7 | 1.4 | 1.8 | 0.15 |
| Density (g/cm³) | 0.9237 | 0.9219 | 0.9255 | 0.9244 |

The polymers described in Examples 1-4 have similar densities of between about 0.922 g/cm³ and about 0.926 g/cm³ but different composition distributions. The composition distributions changed as a result of the varying comonomer/ethylene and hydrogen/ethylene ratios at constant reactor pressure and temperature. Table 1 summarizes the respective gas concentrations and reactor variables as well as density and melt index of the produced polymers of examples 1-4. The $T_{75}$-$T_{25}$ value indicates the change in composition distribution.

The effect of the comonomer/ethylene and hydrogen/ethylene ratios on the composition distributed is demonstrated in FIG. 1. As shown, as the comonomer/ethylene ratio increases, the composition distribution broadens. Since an increase in the comonomer/ethylene ratio would typically lower the density, hydrogen was added to the reactor to offset the density lowering effect of the increased comonomer concentration. The broadening of the composition distributed is further indicated by an increase in the $T_{75}$-$T_{25}$ value with increasing comonomer concentration.

Examples 2 and 3 demonstrate how changes in the comonomer/ethylene ratio affect the breadth of the composition distribution as well as the modality of the composition distribution in the resulting polymers. An increase in the comonomer/ethylene ratio at constant hydrogen concentration can be used to broaden the composition distribution. The TREF curves are shown in FIG. 1.

Examples 2 and 3 further demonstrate that an increase in the comonomer/ethylene ratio at constant hydrogen concentration can be used to change a monomodal composition distribution to a bimodal composition distribution. The composition distributions (TREF curves) are shown in FIG. 1.

Table 2 is directed to gas phase polymerizations of ethylene and 1-hexene with the bis-(n-propylcyclopentadienyl) hafnium dichloride catalyst where the amounts of comonomer and hydrogen in the reactor are varied while maintaining a density from about 0.914 g/cm³ to about 0.917 g/cm³. The melt index was measured according to ASTM-D-1238-E (190° C., 2.16 kg weight). The density was measured according to ASTM D 792. $T_{90}$, $T_{75}$ and $T_{25}$ were measure as described herein.

TABLE 2

| Example | -005 | -006 | -007 | -008 |
|---|---|---|---|---|
| Process data | | | | |
| Molar H2/C2 ratio | 1.7E-4 | 5.3E-4 | 13.3E-4 | 33.1E-4 |
| Molar C6/C2 ratio | 0.012 | 0.013 | 0.016 | 0.015 |
| C2 partial pressure (psi) | 130 | 130 | 130 | 130 |
| RX pressure (psig) | 300 | 300 | 300 | 300 |
| Reactor Temp (° C.) | 75 | 75 | 80 | 80 |
| H2 conc. mol ppm | 59 | 184 | 465 | 1161 |
| H2 flow/sccm | 0 | 5.18 | 14.6 | 36.99 |
| C6 conc. (mol %) | 0.42 | 0.47 | 0.56 | 0.52 |
| C2 conc. (mol %) | 35 | 35 | 35 | 35 |
| C6/C2 flow ratio | 0.073 | 0.089 | 0.131 | 0.14 |
| C2 flow (g/hr) | 614 | 511 | 536 | 545 |
| Production g (polymer)/hr | 487 | 431 | 460 | 475 |
| Residence time (hr) | 3.9 | 4.3 | 4.1 | 4 |
| Avg velocity (ft/s) | 1.6 | 1.6 | 1.59 | 1.57 |
| Resin Properties | | | | |
| $T_{90}$ | 95.4 | 94.7 | 88.4 | 81.5 |
| $T_{75}$-$T_{25}$ | 11 | 22.5 | 18.9 | 19.9 |
| % high density | 50.6 | 35.9 | 9.3 | 3.8 |
| Melt Index (dg/min) | 0.077 | 1.08 | 9.4 | 158 |
| Density (g/cm³) | 0.9144 | 0.9172 | 0.9155 | 0.9164 |

The polymers described in Examples 5-8 have similar densities of between about 0.914 g/cm³ and about 0.917 g/cm³ but different composition distributions. The composition distributions changed as a result of the varying comonomer/ethylene and hydrogen/ethylene ratios at constant reactor pressure. Tables 2 summarize the respective gas concentrations and reactor variables as well as density and melt index of the produced polymers of examples 5-8.

Figure 2:
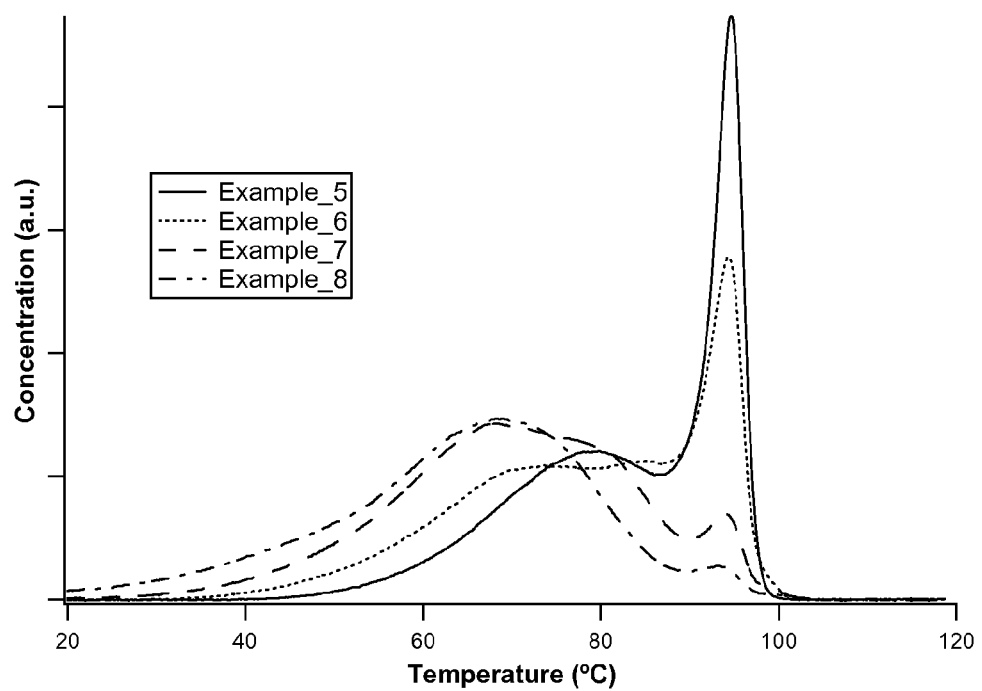
FIG. 2 is a representation of the TREF curves from examples 5-8 from Table 2, plotting normalized concentration as a function of elution temperature.

The effect of the comonomer/ethylene and hydrogen/ethylene ratios on the composition distributed is demonstrated in FIG. 2. As shown, as the hydrogen/ethylene ratio increases, the composition distribution broadens and the relative amounts of high and low temperature peaks change. This change is characterized in that the low temperature peak in the TREF curve increases in contrast to the high temperature peak and also by a decrease in % high density.

Table 3 is directed to gas phase polymerizations of ethylene and 1-hexene with the bis-(n-propylcyclopentadienyl) hafnium dichloride catalyst where the ethylene partial pressure and reactor temperature are varied while maintaining a constant $C_6/C_2$ ratio and a constant hydrogen concentration in the reactor. The melt index was measured according to ASTM-D-1238-E (190° C., 2.16 kg weight). The density was measured according to ASTM D 792.

TABLE 3

| Example | 9 | 10 | 11 | 12 | 13 |
|---|---|---|---|---|---|
| Process data: | | | | | |
| Reactor Temperature (° C.) | 85 | 75 | 75 | 90 | 90 |
| Reactor Pressure (psi) | 350 | 350 | 350 | 350 | 350 |
| C2PP (psi) | 220 | 180 | 240 | 240 | 180 |
| Recycle Gas Velocity (ft./sec) | 1.9 | 1.9 | 1.9 | 1.9 | 1.9 |
| H2/C2 Molar Ratio | 6.5E−4 | 6.5E−4 | 6.5E−4 | 6.5E−5 | 6.5E−4 |
| C6/C2 Molar Ratio | 0.017 | 0.017 | 0.017 | 0.017 | 0.017 |
| Residence Time (hr.) | 2.9 | 2.7 | 3.1 | 3.5 | 3.0 |
| Bed Weight (lbs.) | 110 | 110 | 110 | 110 | 110 |
| Productivity (g polymer/g catalyst) | 3624 | 3728 | 4200 | 3099 | 2628 |
| Resin Properties: | | | | | |
| Melt Index (dg/min) | 0.65 | 0.70 | 0.90 | 0.35 | 0.32 |
| Density (g/cc) | 0.917 | 0.916 | 0.923 | 0.915 | 0.910 |
| % high density | 60.0 | 53.3 | 67.0 | 57.5 | 35.0 |
| % non-crystallizing | 2.6 | 14.3 | 11.1 | 1.4 | 0.8 |

The polymers described in Examples 9-13 were produced with varying ethylene partial pressures and reactor temperatures while maintaining constant $C_6/C_2$ ratios and constant hydrogen concentrations.

Figure 3:
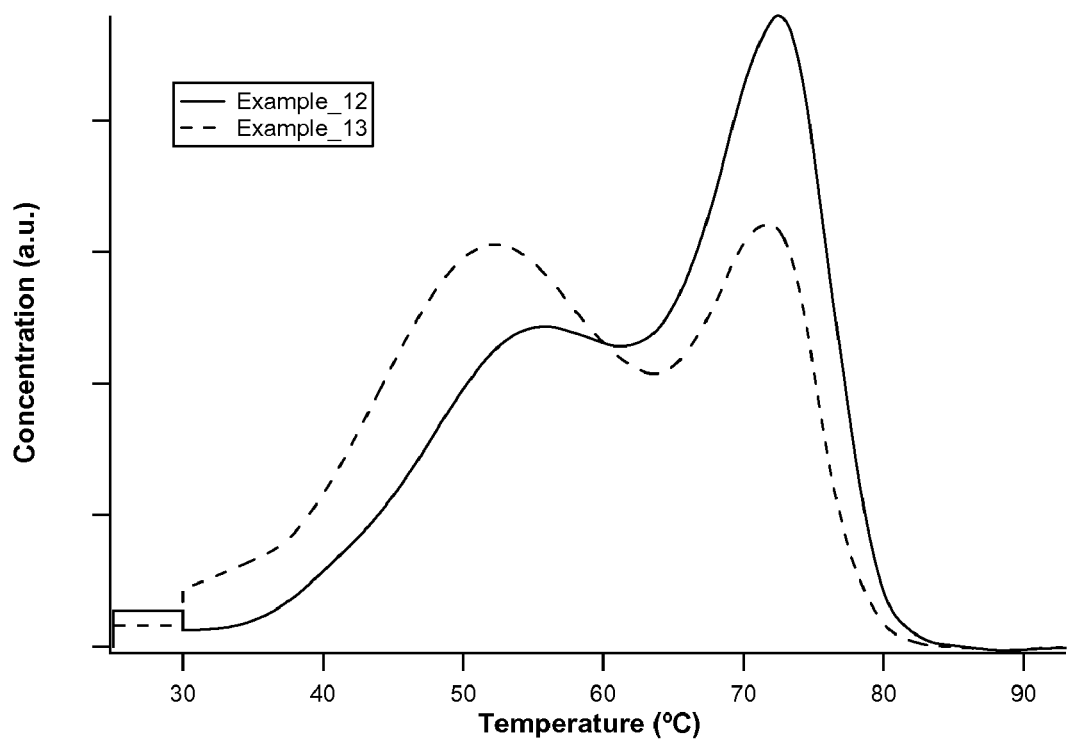
FIG. 3 is a representation of the CRYSTAF curves from examples 12 and 13 from Table 3, plotting the derivative of the cumulative concentration curve as a function of the crystallization temperature.

FIG. 3 shows the CRYSTAF curves of examples 12 and 13 to demonstrate the effect of ethylene partial pressure on the composition distribution: Example 13 was produced with higher ethylene partial pressure (240 psi). It exhibits a relatively strong high temperature peak compared to the low temperature peak. Example 12 was produced at lower ethylene partial pressure of 180 psi while keeping all other variables substantially constant. Compared to Example 13, Example 12 shows a weaker high temperature peak and a stronger low temperature peak.

Figure 4:
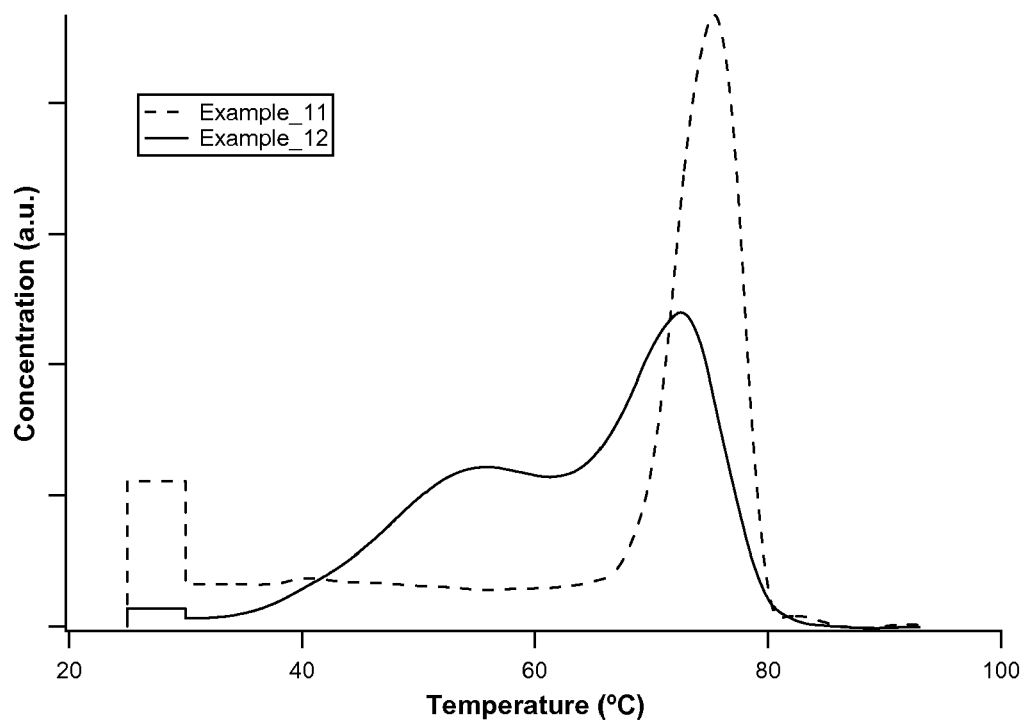
FIG. 4 is a representation of the CRYSTAF curves from examples 11 and 12 from Table 3, plotting the derivative of the cumulative concentration curve as a function of the crystallization temperature.

FIG. 4 shows the CRYSTAF curves of Examples 11 and 12 and demonstrates the effect of reactor temperature on the composition distribution of the produced polymer. Examples 11 and 12 were produced under similar conditions, except Examples 11 was produced at a lower reactor temperature. The polymer produced at higher reactor temperature shows a bimodal composition distribution. A lower reactor temperature significantly increases the fraction of high density polymer (% high density) and the composition distribution of the lower reactor temperature polymer is further altered in that the peak at lower crystallization temperature decreases and thus a monomodal composition distribution results. Furthermore, a lower reactor temperature increases the fraction of non-crystallizing polymer chains as evidenced by a stepwise increase in the CRYSTAF trace below 30° C.

Figure 5:
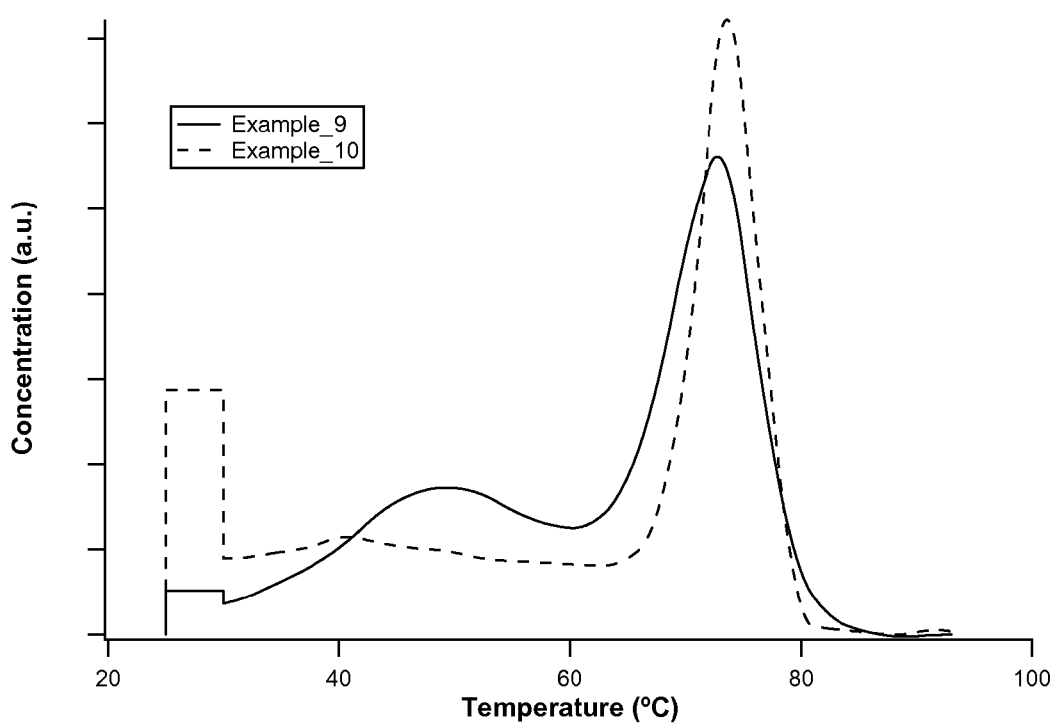
FIG. 5 is a representation of the CRYSTAF curves from examples 9 and 10 from Table 3, plotting the derivative of the cumulative concentration curve as a function of the crystallization temperature.

FIG. 5 shows the CRYSTAF curves of Examples 9 and 10. In FIG. 5, it is shown that two resins having similar densities and melt indices but different composition distributions can be produced by adjusting reactor temperature and ethylene partial pressure. The resin produced at lower reactor temperature and lower ethylene partial pressure (Example 10) shows a lower high density fraction (% high density) but a greater non crystallizing fraction.

As stated above, it would be desirable to control the composition distribution of an ethylene alpha-olefin copolymer and produce polyethylene resins without having to change the catalyst composition and without having to use multiple reactors. In various embodiments described herein, the invention provides for at least one of utilizing hydrogen concentration, the ratio of comonomer to ethylene, reactor temperature, and ethylene partial pressure in combination with the catalyst system to tailor at least one of melt index, density, and composition distribution of the polymer product such as polyethylene.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method of forming a first and a second ethylene alpha-olefin copolymer, the method comprising contacting a reaction mixture and a catalyst system comprising a hafnocene in a reactor, the reaction mixture comprising ethylene, hydrogen, and one or more alpha olefins, and altering at least one or more of the following:
  i) the molar ratio of hydrogen to ethylene,
  ii) the molar ratio of comonomer to ethylene,
  iii) the ethylene partial pressure and, and
  iv) the reactor temperature;
so that the first ethylene alpha-olefin copolymer has a monomodal composition distribution characterized by having a single peak in a TREF experiment and the second ethylene alpha-olefin copolymer has a multimodal composition distribution characterized by having at least two peaks in a TREF experiment.

2. The method of claim 1, wherein the densities of the first and the second ethylene alpha-olefin copolymer differ by no more than 0.015 g/cm$^3$.

3. The method of claim 1, wherein the densities of the first and the second ethylene alpha-olefin copolymer differ by no more than 0.008 g/cm$^3$.

4. The method of claim 1, wherein the densities of the first and the second ethylene alpha-olefin copolymer differ by no more than 0.004 g/cm$^3$.

5. The method of claim 1, wherein the melt indices of the first and the second ethylene alpha-olefin copolymer differ by no more than 20%.

6. The method of claim 1, wherein the melt indices of the first and the second ethylene alpha-olefin copolymer differ by no more than 10%.

7. The method of claim 1, wherein the hafnocene is selected from the group consisting of:
  bis(n-propylcyclopentadienyl)hafnium X$_2$, bis(n-butylcyclopentadienyl)hafnium X$_2$, bis(n-pentylcyclopentadienyl)hafnium X$_2$, (n-propyl cyclopentadienyl)(n-butyl-cyclopentadienyl)hafnium X$_2$, bis[(2-trimethylsilylethyl)cyclopentadienyl]hafnium X$_2$, bis(trimethylsilyl cyclopentadienyl)hafnium X$_2$, dimethylsilylbis(n-propylcyclopentadienyl)hafnium X$_2$, dimethylsilylbis(n-butylcyclopentadienyl)hafnium X$_2$, bis(1-n-propyl-2-methylcyclopentadienyl)hafnium X$_2$, and (n-propylcyclopentadienyl)(1-n-propyl-3-n-butylcyclopentadienyl)hafnium X$_2$;
  wherein X is selected from the group consisting of halogen ions, hydrides, C1-12 alkyls, C2-12 alkenyls, C6-12 aryls, C7-20 alkylaryls, C1-12 alkoxys, C6-16 aryloxys, C7-18 alkylaryloxys, C1-12 fluoroalkyls, C6-12 fluoroaryls, and C1-12 heteroatom-containing hydrocarbons and substituted derivatives thereof.

8. The method of claim 1, wherein the catalyst system comprises an activator.

9. The method of claim 1, wherein the activator comprises an alumoxane.

10. The method of claim 9, wherein the ratio of Aluminum to Hafnium is from 60:1 to 150:1.

11. The method of claim 9, wherein the ratio of Aluminum to Hafnium is from 80:1 to 120:1.

12. The method of claim 1, wherein the reaction mixture further comprises at least one condensing agent that comprises an aliphatic hydrocarbon selected from the group consisting of ethane, propane, n-butane, isobutane, n-pentane, isopentane, neopentane, n-hexane, isohexane, heptane, n-octane, and combinations thereof.

13. A method of forming a first and a second ethylene alpha-olefin copolymer, the method comprising contacting a reaction mixture and a catalyst system comprising a hafnocene in a reactor, the reaction mixture comprising ethylene, hydrogen, and one or more alpha olefins, and altering at least one or more of the following:
  i) the molar ratio of hydrogen to ethylene,
  ii) the molar ratio of comonomer to ethylene,
  iii) the ethylene partial pressure and,
  iv) the reactor temperature;
so that the $T_{90}$ value of the first ethylene alpha-olefin copolymer and the second ethylene alpha-olefin copolymer differ by 5° C. or more.

14. The method of claim 13, wherein the densities of the first and the second ethylene alpha-olefin copolymer differ by no more than 0.015 g/cm$^3$.

15. The method of claim 13, wherein the densities of the first and the second ethylene alpha-olefin copolymer differ by no more than 0.008 g/cm$^3$.

16. The method of claim 13, wherein the melt indices of the first and the second ethylene alpha-olefin copolymer differ by no more than 20%.

17. The method of claim 13, wherein the melt indices of the first and the second ethylene alpha-olefin copolymer differ by no more than 10%.

18. The method of claim 13, wherein the hafnocene is selected from the group consisting of:
  bis(n-propylcyclopentadienyl)hafnium X$_2$, bis(n-butylcyclopentadienyl)hafnium X$_2$, bis(n-pentylcyclopentadienyl)hafnium X$_2$, (n-propyl cyclopentadienyl)(n-butyl-cyclopentadienyl)hafnium X$_2$, bis[(2-trimethylsilylethyl)cyclopentadienyl]hafnium X$_2$, bis(trimethylsilyl cyclopentadienyl)hafnium X$_2$, dimethylsilylbis(n-propylcyclopentadienyl)hafnium X$_2$, dimethylsilylbis(n-butylcyclopentadienyl)hafnium X$_2$, bis(1-n-propyl-2-methylcyclopentadienyl)hafnium X$_2$, and (n-propylcyclopentadienyl)(1-n-propyl-3-n-butylcyclopentadienyl)hafnium X$_2$;
  wherein X is selected from the group consisting of halogen ions, hydrides, C1-12 alkyls, C2-12 alkenyls, C6-12 aryls, C7-20 alkylaryls, C1-12 alkoxys, C6-16 aryloxys, C7-18 alkylaryloxys, C1-12 fluoroalkyls, C6-12 fluoroaryls, and C1-12 heteroatom-containing hydrocarbons and substituted derivatives thereof.

19. The method of claim 13, wherein the catalyst system comprises an activator that comprises an alumoxane.

20. The method of claim 13, wherein the ratio of Aluminum to Hafnium is from 60:1 to 150:1.

21. A method of forming a first and a second ethylene alpha-olefin copolymer, the method comprising contacting a reaction mixture and a catalyst system comprising a hafnocene in a reactor, the reaction mixture comprising ethylene, hydrogen, and one or more alpha olefins, and altering at least one or more of the following:
  i) the molar ratio of hydrogen to ethylene,
  ii) the molar ratio of comonomer to ethylene,
  iii) the ethylene partial pressure and,
  iv) the reactor temperature;
so that the $T_{75}-T_{25}$ value of the first ethylene alpha-olefin copolymer and the second ethylene alpha-olefin copolymer differ by 5° C. or more.

22. The method of claim 21, wherein the $T_{75}-T_{25}$ value of the first ethylene alpha-olefin copolymer and the second ethylene alpha-olefin copolymer differ by 10° C. or more.

23. The method of claim 21, wherein the densities of the first and the second ethylene alpha-olefin copolymer differ by no more than 0.015 g/cm$^3$.

24. The method of claim 21, wherein the densities of the first and the second ethylene alpha-olefin copolymer differ by no more than 0.008 g/cm$^3$.

25. The method of claim 21, wherein the melt indices of the first and the second ethylene alpha-olefin copolymer differ by no more than 20%.

26. The method of claim 21, wherein the hafnocene is selected from the group consisting of:
bis(n-propylcyclopentadienyl)hafnium $X_2$, bis(n-butylcyclopentadienyl)hafnium $X_2$, bis(n-pentylcyclopentadienyl)hafnium $X_2$, (n-propyl cyclopentadienyl)(n-butylcyclopentadienyl)hafnium $X_2$, bis[(2-trimethylsilylethyl)cyclopentadienyl]hafnium $X_2$, bis(trimethylsilyl cyclopentadienyl)hafnium $X_2$, dimethylsilylbis(n-propylcyclopentadienyl)hafnium $X_2$, dimethylsilylbis(n-butylcyclopentadienyl)hafnium $X_2$, bis(1-n-propyl-2-methylcyclopentadienyl)hafnium $X_2$, and (n-propylcyclopentadienyl)(1-n-propyl-3-n-butylcyclopentadienyl)hafnium $X_2$;

wherein 26 is selected from the group consisting of halogen ions, hydrides, C1-12 alkyls, C2-12 alkenyls, C6-12 aryls, C7-20 alkylaryls, C1-12 alkoxys, C6-16 aryloxys, C7-18 alkylaryloxys, C1-12 fluoroalkyls, C6-12 fluoroaryls, and C1-12 heteroatom-containing hydrocarbons and substituted derivatives thereof.

* * * * *